Figures 1, 2:
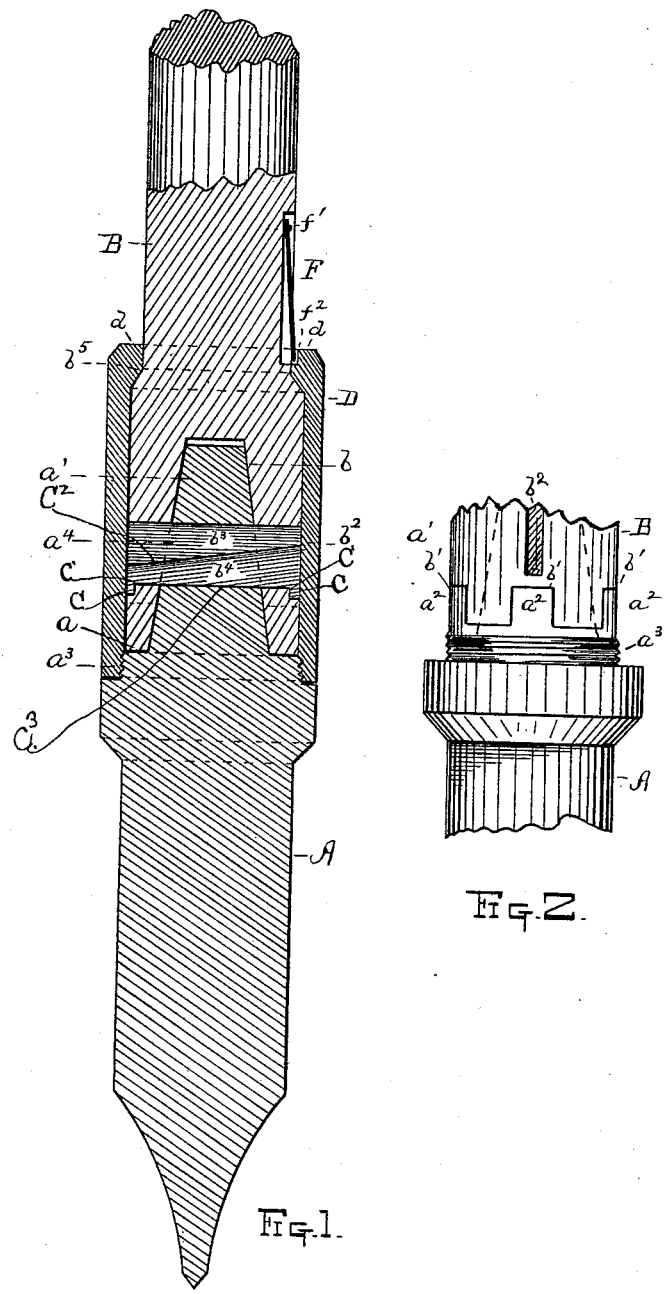

(No Model.)

P. H. FOLEY.
ROCK DRILL.

No. 329,545. Patented Nov. 3, 1885.

WITNESSES:
Pierrepont Bartow.
Charles De F. Hosoie,

P. H. Foley INVENTOR.

BY Risley Luin & Perry
ATTORNEYS.

United States Patent Office.

PATRICK H. FOLEY, OF CLINTON, NEW YORK.

ROCK-DRILL.

SPECIFICATION forming part of Letters Patent No. 329,545, dated November 3, 1885.

Application filed June 9, 1885. Serial No. 163,202. (No model.)

*To all whom it may concern:*

Be it known that I, PATRICK H. FOLEY, of Clinton, in the county of Oneida and State of New York, have invented certain new and useful Improvements in Drill-Couplings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a drill-coupling; and it consists in a tapering pin or shank fitted into a tapering box, in flanges and grooves for preventing the bit from twisting, in a pin and slot for securing the coupling, in a sleeve for covering the coupling, and other mechanism hereinafter described and pointed out.

Heretofore drilled couplings have been uniformly made by means of screw-threads, which are very liable to become loose by the continual jar in drilling rock, the threads becoming upset and the bit loosened and not unfrequently becoming detached, frequently at great depth, causing serious trouble in sinking deep wells. To overcome this difficulty I provide a tapering pin or shank on the end of the bit or drill, which fits into a tapering chamber in the drill-stem, which for all practical purposes when properly fitted would be a sufficient coupling; but for additional security, and to obviate the tendency of the bit or drill to turn in the drill-stem whenever the bit strikes a seam in the rock, I provide a system of slots and flanges, and also a pin passing through the box and tapering pin or shank for securing a rigid coupling; and for preventing wear and other purposes I provide a sleeve which covers the coupling-joint.

Figure 1 represents a vertical section of the bit, the bit-stem, keys, and sleeve forming my improved coupling. Fig. 2 represents a section of the bit and stem with the sleeve removed, showing the grooves and projections for preventing the bits turning in the drill-stem.

Having described my invention by reference to the figures illustrated in the accompanying drawings, I will now proceed to describe the same by reference to the letters marked thereon, in which similar letters of reference refer to corresponding parts throughout the several views.

In the drawings, A represents a bit or drill formed of steel; but other forms of construction of the cutting end may be used. On the upper end of this bit I provide a shoulder and the tapering pin or shank $a'$. On the surface of shoulder $a$, I provide one or more projections similar to $a^2$. On the periphery of the bit, below the shoulder, I provide a raised surface cut with screw-threads, $a^3$. In the tapering pin or shank I provide a slot, $a^4$, for receiving and retaining keys to be inserted therein. One or more keys may be used.

For forming a coupling of this drill or bit with bit-stem B, I provide, in the lower end of the bit-stem, tapering box, $b$, to receive tapering pin or shank $a'$. On the lower surface of the bit-stem I provide slots $b'$, which fit projections $a^2$, for preventing the bit from turning. It is quite obvious that one or more of these slots and projections may be used, or the same may be reversed, or a pin and aperture would secure the same result, the purpose being, as before stated, the forming of a locking device for the purposes mentioned. I also provide slots $b^2$, which pass through the wall surrounding the tapering box, into which, for convenience in forming an additional coupling, I insert keys $b^3$ and $b^4$, which pass through aperture $a^4$ in the tapering pin or shank. It will be observed that the pin $b^4$ is provided with a straight face, $c^3$, and an inclined face, $c^2$. At both ends of this pin I form a projection, $c\ c$, which fits down over the sides of the drill at $c'\ c'$. By this construction it will be seen at a glance that I can, by the pin $f^3$, which is tapering on its lower face, compensate for any wear of the top of the drill-head or of the wear in the conical aperture or recess in the stem. This feature is of prime importance in this device, as it often occurs that these drills wear at this point and soon work loose. $b^5$ represents a projecting shoulder on the lower portion of the bit-stem.

For covering the coupling-joint and securing the same I provide sleeve D with a projecting flange, $d$, projecting inward, for engaging shoulder $b^5$ on the bit-stem. In the lower portion of the sleeve screw-threads are provided for engaging the screw-threads on the bit or drill. To secure the joints, the sleeve is placed over the bit-stem and lowered until the projecting-flange $d$ in the sleeve engages shoulder $b^5$ on the bit-stem. The same is then screwed tightly. By constructing this sleeve D with a thick shoulder, $d$, the upper portion of the recessed head of the stem is materially strengthened, and any danger of splitting at this point is avoided.

For preventing the sleeve from working loose, and to secure to the same when in position, I provide spring F, which is recessed into the drill-stem and riveted to the same at $f'$. The lower end of the spring engages a groove, $f^2$, in the sleeve, thereby holding and preventing the latter from working loose.

What I claim as new, and desire to secure by Letters Patent, is—

1. In a drill-coupling, the tapering shank on the head of the drill, in combination with the stem, which is recessed or mortised to receive and accommodate the tapering shank, and the sleeve having the strengthening-flange at the top, which serves to re-enforce the stem-head and encircles and secures together both shank and stem, substantially as set forth.

2. In a drill-coupling having a tapering chamber and tapering pin or shank, the combination of the locking device, consisting of the interlocking projections and recesses on the drill and corresponding projections on and recesses in the stem to prevent rotation of the drill, and the sleeve D, substantially as set forth.

3. In a drill-coupling, the perforated tapering shank, in combination with the correspondingly perforated and recessed or mortised stem-head, and keys $b^3$ and $b^4$, (one of which is provided with the projections $c\ c$,) and means for securing the keys in place in the coupling, substantially as described.

4. In a drill-coupling having a tapering chamber for receiving a tapering shank on the end of the drill, the combination of the drill and the sleeve with inwardly-projecting flanges fitting over and resting on a projecting shoulder on the drill-stem and engaging with screw-threads on the drill, substantially as described.

5. In a drill-coupling having a tapering box or chamber for receiving a tapering shank on the end of the drill, a sleeve for covering the coupling, in combination with a spring riveted to the stem in a recess in the latter and engaging with the sleeve, whereby the sleeve is prevented from working loose, substantially as described.

6. In a drill-coupling, the perforated tapering shank on the drill and the correspondingly perforated and recessed or mortised stem, in combination with a sleeve, which serves the double purpose of a re-enforcing or strengthening device for the stem-head and a means for securing the stem and drill together, and the secondary fastening consisting of a pair of keys extending through the stem-head and drill-shank, all constructed, arranged, and combined to operate substantially as set forth.

In witness whereof I have affixed my signature in presence of two witnesses.

PATRICK H. FOLEY.

Witnesses:
EDWIN H. RISLEY,
JOSIAH PERRY.